(12) United States Patent
Allen

(10) Patent No.: US 6,402,220 B2
(45) Date of Patent: Jun. 11, 2002

(54) PORTABLE ENCLOSURE

(76) Inventor: Edmund L. Allen, 8857 Oak Grove Rd., Stanfield, NC (US) 28163

( * ) Notice: Subject to any disclaimer, the term of this patent is extended or adjusted under 35 U.S.C. 154(b) by 0 days.

(21) Appl. No.: 09/827,038

(22) Filed: Apr. 5, 2001

Related U.S. Application Data

(60) Provisional application No. 60/194,971, filed on Apr. 5, 2000.

(51) Int. Cl.$^7$ .................................................. B60J 1/00
(52) U.S. Cl. ...................... 296/77.1; 296/29; 296/78.1; 135/126; 135/124
(58) Field of Search ............................. 296/77.1, 78.1, 296/79, 182; 135/123, 124, 127, 125, 126, 88.06, 88.01

(56) References Cited

U.S. PATENT DOCUMENTS

| | | | | |
|---|---|---|---|---|
| 3,709,553 A | * | 1/1973 | Churchill et al. ............. | 296/79 |
| 3,929,145 A | * | 12/1975 | Schroeder ................... | 135/128 |
| 4,336,964 A | * | 6/1982 | Pivar ......................... | 296/77.1 |
| 4,582,355 A | * | 4/1986 | Hall ........................... | 296/77.1 |
| 4,706,696 A | * | 11/1987 | Gillis .......................... | 135/127 |
| 4,719,935 A | * | 1/1988 | Gustafson ................... | 135/124 |
| 4,739,784 A | * | 4/1988 | Fast ............................ | 135/123 |
| 4,991,363 A | * | 2/1991 | Randmae .................. | 135/88.06 |
| 5,033,493 A | * | 7/1991 | Senchuck ................... | 135/128 |
| 5,072,987 A | * | 12/1991 | Allen .......................... | 296/79 |
| 5,343,887 A | * | 9/1994 | Danaher ..................... | 135/126 |
| 5,458,390 A | * | 10/1995 | Gilbert ....................... | 296/78.1 |
| 5,660,425 A | * | 8/1997 | Weber ..................... | 135/88.01 |
| 5,785,333 A | * | 7/1998 | Hinkston et al. .......... | 296/77.1 |
| 5,823,217 A | * | 10/1998 | Rice ........................... | 135/124 |
| 5,961,175 A | * | 10/1999 | Clardy ...................... | 296/77.1 |
| 6,011,504 A | * | 1/2000 | Tan ............................. | 342/1 |
| 6,142,253 A | * | 11/2000 | Mueller et al. ............ | 180/219 |
| 6,192,633 B1 | * | 2/2001 | Hilbert ...................... | 52/2.18 |
| 6,206,447 B1 | * | 3/2001 | Nation ...................... | 296/77.1 |
| 6,260,913 B1 | * | 7/2001 | Sekita et al. ............... | 296/77.1 |
| 6,293,616 B1 | * | 9/2001 | Williams et al. .......... | 296/77.1 |

* cited by examiner

*Primary Examiner*—Ken Patel
(74) *Attorney, Agent, or Firm*—Olive & Olive, P.A.

(57) ABSTRACT

The present invention provides a portable enclosure for use in protecting an all-terrain vehicle or another open-topped vehicle against damage and degradation from exposure to the weather. A further use of the portable enclosure of the invention is as a blind for use in hunting. The portable enclosure includes bendable support beams that arch from front to rear mounting brackets attached to the vehicle. The support beams are held parallel to one another by cross braces and a top panel. Additional front, rear, and side panels, each being equipped with a transparent window, are attached to the top panel and each other by Velcro® or zipper fasteners. The support beams and cross braces are segmented to pack into a carrying case along with the folded fabric panels.

14 Claims, 3 Drawing Sheets

PORTABLE ENCLOSURE

RELATED APPLICATION

This application is a conversion of and claims priority from U.S. Provisional Application No. 60/194,971, filed Apr. 5, 2000.

FIELD OF THE INVENTION

The present invention relates to protective enclosures for vehicles, and more particularly to a portable protective enclosure for an all-terrain vehicle to provide protection from the sun, rain, snow, and other weather conditions.

BACKGROUND OF THE INVENTION

All-terrain vehicles (ATV) are intended for sports use in a variety of environments and topographies. Typically, an ATV is open-topped, more similar to a motorcycle than a passenger car. These vehicles, while they are built to be rugged and withstand structural damage, are subject to degradation of their exposed surfaces, especially paint finish and fabrics. As such, the seat, the steering apparatus (handlebars or wheel), and the body panels are subject to being discolored or faded by sun, rain, and temperature extremes. In addition to damage, the seat will frequently be wet or icy due to such exposures, making it unpleasant for use. These weather effects occur during times when the ATV is used for a camping or hunting trip, but will also occur over much longer times when the vehicle is stored outdoors near the user's home for long periods.

Therefore, it is an object of the present invention to provide an enclosure for use in connection with an ATV and which could shield the ATV from weather conditions which may cause the vehicle to be unpleasant for use, and to prevent premature aging and/or degradation of the appearance of the vehicle.

It is a further object of the present invention to provide an enclosure for use in connection with an ATV which is portable and easy to assemble.

It is another object of the present invention to provide an enclosure for use in connection with an ATV that can also serve as a hunting blind.

These and other objects will become more apparent from the description of the invention to follow.

SUMMARY OF THE INVENTION

The invention provides a portable enclosure for an ATV that includes a number of mounting brackets that are assembled to the vehicle's cargo racks. The enclosure comprises a pair of support rods that are removably connected to the mounting brackets. A number of panels are supported by the support rods in removable fashion to cover the top and sides of the ATV to provide protection from the sun, rain, snow, frost, dew and other weather conditions. The panels are made of a water resistant fabric having a camouflage appearance to enable it to act as a blind, and the side panels are provided with clear windows.

BRIEF DESCRIPTION OF THE DRAWINGS

In order to achieve a further understanding of the nature and objects of the present invention, reference should be had to the following detailed description, taken in conjunction with the accompanying drawings, in which the elements are given the same or analogous reference numbers and wherein.

DESCRIPTION OF THE PREFERRED EMBODIMENT

Figure 1:
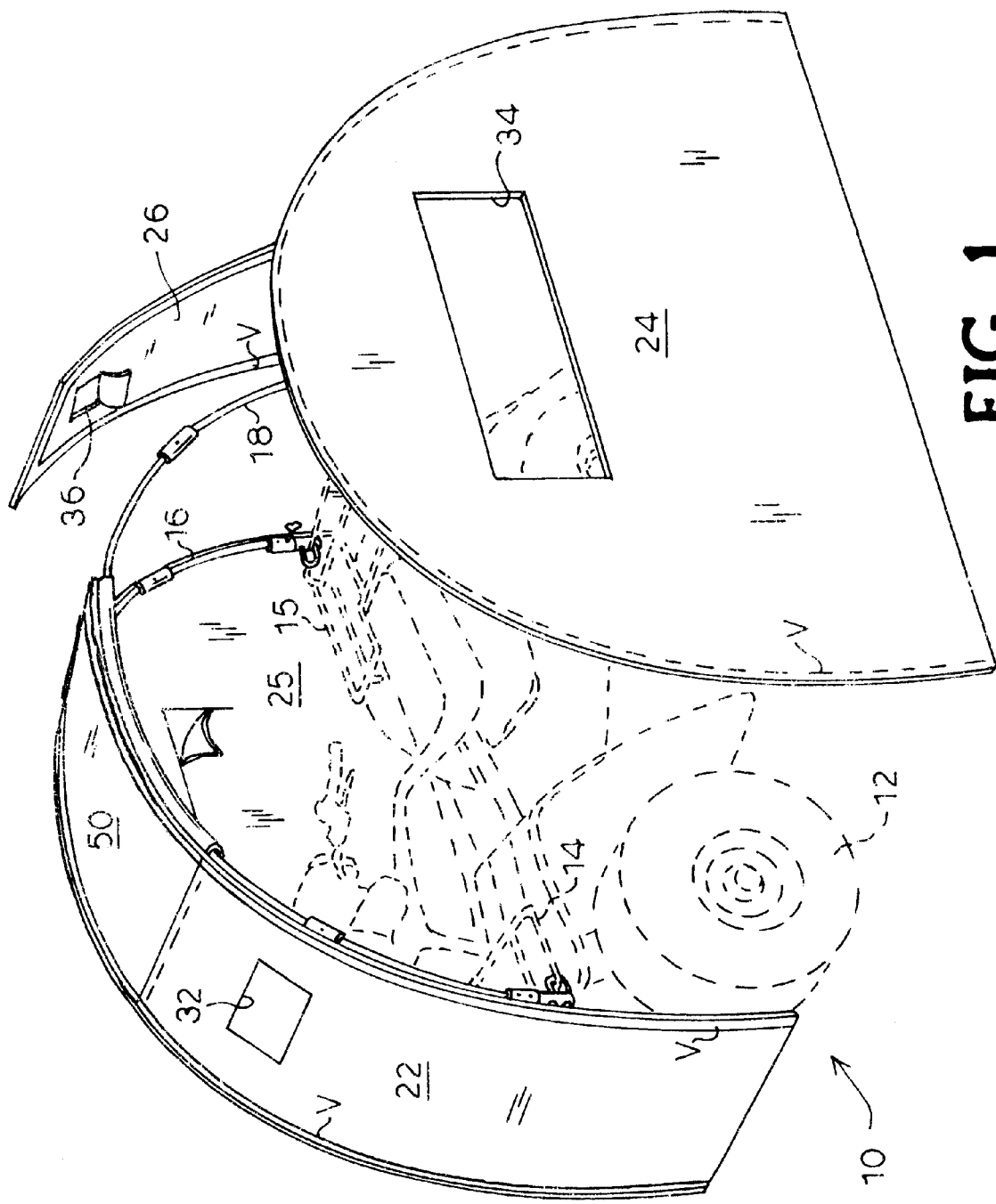
FIG. 1 shows an exemplary embodiment of the portable enclosure of the present invention in partially exploded perspective view with an ATV positioned therewithin.

Referring now to FIG. 1, a partly exploded perspective view of portable enclosure 10 is illustrated with an all-terrain vehicle (ATV) 12 shown therewithin. Portable enclosure 10 is formed of support beams 16 and 18, side panels 22 and 26, front panel 24, rear panel 25, and top panel 50. Support beams 16 and 18 form an arch over the top of ATV 12 to form a skeleton upon which panels 22, 24, 25, 26, and 50 are mounted to serve as a housing, or hut, to cover ATV 12, with additional space enclosed therewithin. When assembled, portable enclosure 10 covers ATV 12 at least to a level below its seat and body panels. There is sufficient space within portable enclosure 10, in the preferred embodiment, for a user of ATV 12 to sit thereupon and be hidden from view and protected from the weather. As used herein, the term "arch" is intended to include a structure with a generally arcuate form and such a structure with a different shape, for example having a flat, horizontal top portion and linear support columns that are either vertical or non-vertical.

Figure 3:
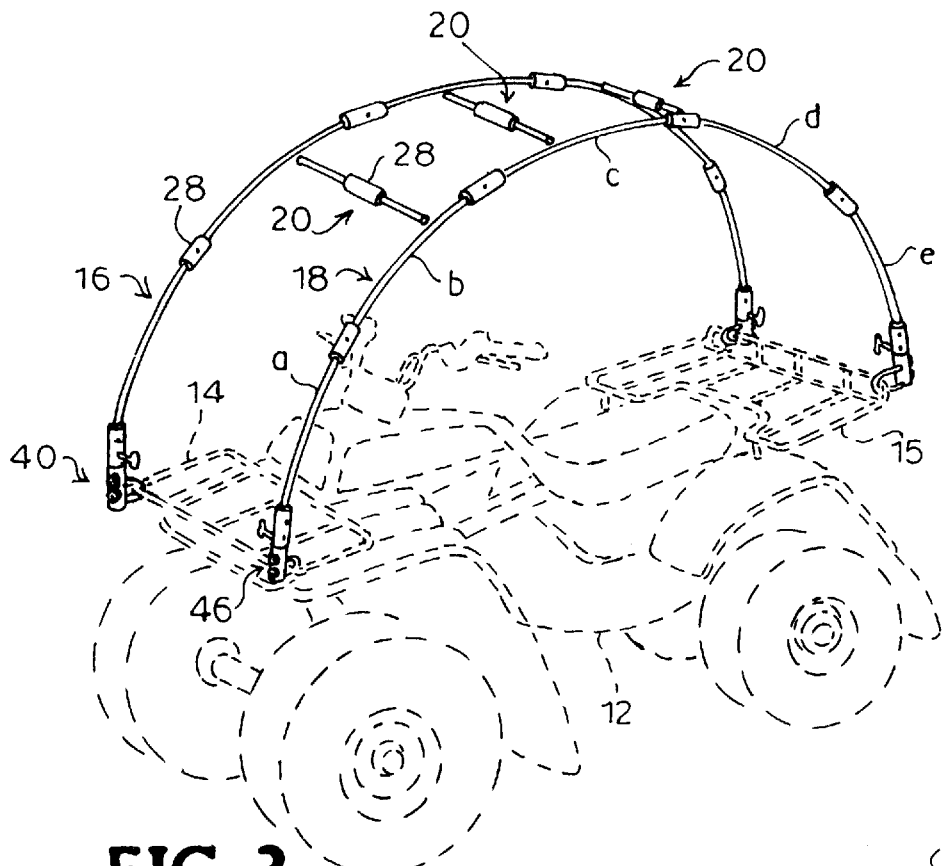
FIG. 3 is the embodiment of the invention according to FIG. 1, showing the portable enclosure support structure with no closure panels.

Referring now to FIG. 3, the structural support system of portable enclosure 10 of the invention is illustrated without closure panels attached thereto. Support beams 16 and 18 are shown in parallel arching orientation over ATV 12. Support beams 16 and 18 are maintained in substantially parallel orientation by the interposition of a number of cross braces 20, according to the preferred embodiment of the invention, as more fully described below. Cross braces 20 are oriented substantially perpendicular to support beams 16 and 18.

Figure 4:
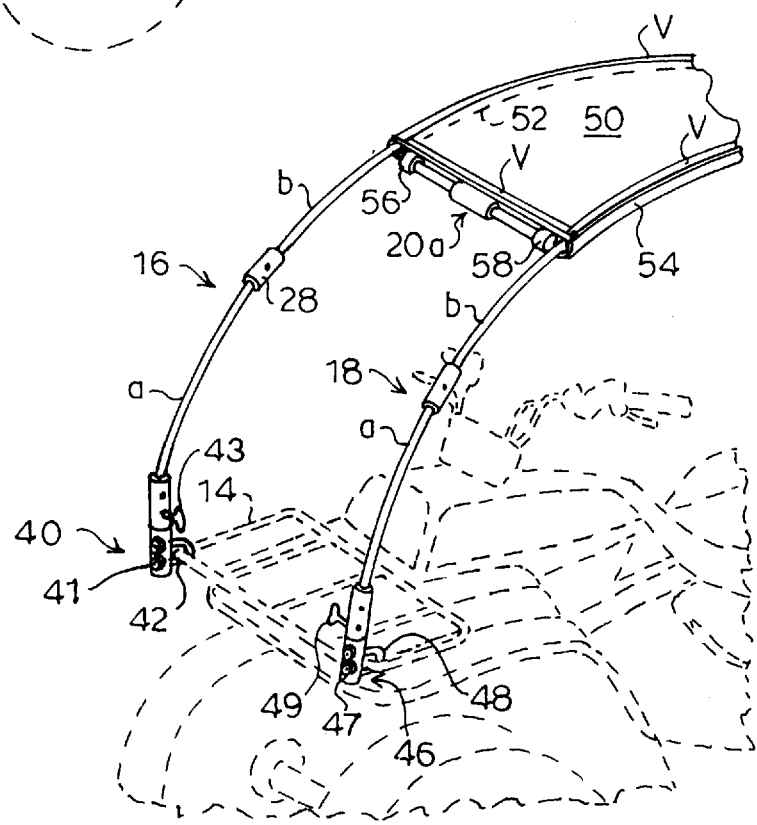
FIG. 4 is an enlarged perspective view of the front portion of the ATV with a pair of mounting brackets connected to its cargo rack and a support pole mounted to each mounting bracket.

FIG. 4 shows an enlarged view of the front portion of ATV 12. Support beams 16 and 18 are positioned respectively into a pair of sleeves 52 and 54 formed along opposed edges of top panel 50, preferably by sewing. Cross braces 20 are held in position to maintain the spacing of support beams 16 and 18 by placing the ends of cross braces 20 into a set of end connectors 56 and 58 that are formed as short, closed-end sleeve portions adjacent the side edges of top panel 50. With three pairs of end connectors 56 and 58 mounted adjacent sleeves 52 and 54 on the bottom surface of top panel 50 in spaced-apart locations, support beams 16 and 18 placed through sleeves 52 and 54, and the ends of respective cross braces 20 inserted into end connectors 56 and 58, top panel 50 is maintained substantially taut, and support beams 16 and 18 spaced apart from one another. The positioning of support beams 16 and 18 is thus controlled by the position of sleeves 52 and 54 and cross braces 20. While the preferred embodiment of the invention orients support beams 16 and 18 parallel to one another, another relationship, for example with the central portion of top panel 50 being less wide than the ends thereof so that support beams 16 and 18 converge at their topmost part as assembled, is also considered to be within the scope of the invention.

Continuing with FIG. 4, a typical ATV 12 has a cargo rack 14 mounted to its front top portion, and second cargo rack 15 (seen in FIG. 1) mounted to its rear portion. The invention provides a set of four mounting brackets 40 and 46 (only two mounting brackets shown) for mounting support beams 16 and 18 to ATV 12. Typical mounting bracket 46 consists of clamp 48, stem 49, and lock 47, corresponding to mounting bracket 40 consisting of clamp 42, stem 43 lock 41. Clamp 48 is preferably a "U" bolt for encircling a selected bar of cargo rack 14 or 15 and for holding stem 49 in substantially vertical orientation thereto. Stem 49 is formed with a pair of through holes for receiving the end portions of clamp 48 and further is formed with an upper portion configured for being engaged within the end of a respective support beam 16 or 18. According to design considerations, the upper end of stem 49 may engage support beam 16 or 18 internally or externally, with lock 47, preferably being a fastener, for example a screw with a "wing" head, provided for engaging and locking support beam 16 or 18 thereto. Mounting brackets 40 and 46, are intended to be permanently mounted to ATV 12. In an alternate embodiment, suited for use with a riding lawn mower or other open-topped vehicle not typically having a cargo rack, a mounting bracket can be clamped onto, or screwed to, an available portion of a body panel of the vehicle.

As further seen in FIGS. 3 and 4, support beams 16 and 18 are formed of a series of segments a, b, c, d, e that are connected to one another by a series of couplings 28. In the preferred embodiment, support beams 16 and 18 are each comprised of five segments a–e, thus requiring four couplings 28 for each. An additional coupling 28 is mounted to each end of support beams 16 and 18 to enable secure attachment to mounting bracket 46. The segments a–e are preferably formed of a bendable, resilient, material, for example fiberglass reinforced synthetic resin. As such, segments a–e will conform to an arcuate shape when the ends of support beams 16 and 18 are placed into engagement with mounting brackets 40 and 46, and will return to a substantially straight shape when unstressed. Alternatively, segments a–e can be formed with a permanent arcuate shape. Segments a–e are preferably round in cross section and tubular to permit the insertion of a cord 30 (see FIG. 5) to connect all the sections together and to provide a stable support for portable enclosure 10. Couplings 28 are also round in cross section and tubular to engage the outer surface of segments a–e. Couplings 28 include a centrally-positioned stop 29, for example a cross pin, which may be along or parallel to a diameter of coupling 28 passing through the axial bore thereof. Cord 30 is preferably elastic and permanently installed in segments a–e. The coupling 28 that is assembled at each end of support beams 16 and 18 is also formed with a cross hole 27, adapted to pass lock 47 therethrough. The invention recognizes that other cross sectional shapes for segments a–e and couplings 28 will also perform satisfactorily, for example, a triangular cross sectional shape. Cross braces 20 are formed similarly to the construction of support beams 16 and 20, and are divided into two segments each with one coupling 28 for each, as is appropriate to their relatively short length. Cross braces 20 may also be assembled with an internal cord.

Each of panels 22, 24, 25, 26, and 50, is formed of a weather resistant fabric, preferably a synthetic fabric, most preferably a nylon fabric. Each edge of panels 22, 24, 25, 26, and 50, is fitted with mating Velcro® hook and loop connectors V, or optionally zippers, to enable the adjoining panels to be securely held together and to protect the enclosed ATV against weather elements. For use with an ATV, it is further preferred to apply a camouflage design to the fabric, since ATVs are commonly used by hunters in wooded settings, and since the portable enclosure of the invention is intended to be used as a hunting blind. When used as a hunting blind, the user sits on the ATV, opens one or more transparent panels (described below), and awaits the approach of prey.

Figure 2:
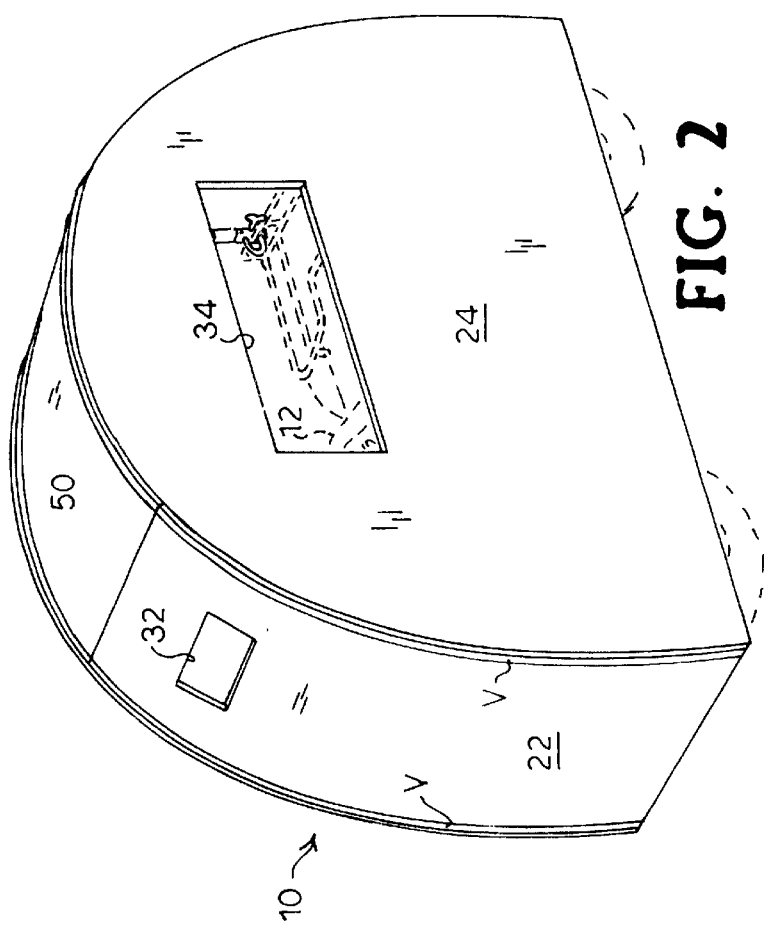
FIG. 2 is the embodiment of the invention according to FIG. 1, wherein all closure panels of the enclosure are closed.

As shown in FIGS. 1 and 2, each of panels 22, 24, 25, and 26, is fitted with a transparent panel 32, 34, 35, and 36 as a window. Transparent panels 32, 34, 35, and 36 are fixedly connected at the lower edge thereof to respective panels 22, 24, 25, and 26 the other edges being releasably connected by means of Velcro® hook and loop pads or a zipper V. In that way, transparent panels 32, 34, 35, and 36 may each be opened while remaining connected to the respective side panel. No transparent panel is located in top panel 50.

Figure 5:
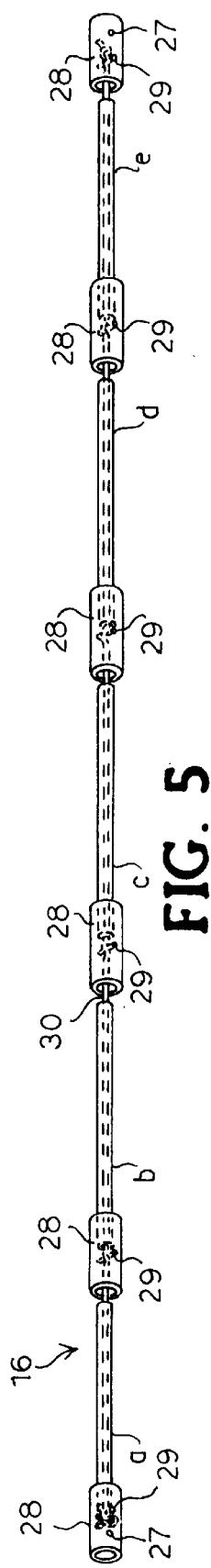
FIG. 5 is a perspective view of a support rod of the invention in which segments thereof are linear and separated for folding and storage with a connecting cord shown in place.

FIG. 5 illustrates typical support beam 16 with segments a–e in separated relation. Segment a terminates with coupling 28 that is sized to engage a respective mounting bracket 40 or 46 (see FIG. 4). Segment b terminates with coupling 28 that is sized to engage the adjacent end of segment a. Additional segments c, d and e are similarly formed. Elastic cord 30 passes through all segments of support beam 16 and serves to bias all segments to remain in engagement with adjacent segments.

Referring again to FIGS. 1 and 2, portable enclosure 10 is assembled by first assembling two sets of segments a–e to become linear support beams 16 and 18. Support beams 16 and 18 are next placed through sleeves 52 and 54 in top panel 50. Cross braces 20 are assembled from their two segments each to be linear, and the ends thereof are inserted into respective end connectors 56 and 58 of top panel 50 to cause top panel 50 to be taut in the crosswise direction and support beams 16 and 18 to be substantially parallel. The user then places a first end of each of support beams 16 and 18 into engagement with front mounting brackets 40 and 46, previously mounted to ATV 12, locking the engagement thereof with locks 41 and 47. The second ends of support beams 16 and 18 are then forced down so as to cause support beams 16 and 18 to form into an arcuate shape and their respective ends are connected in similar fashion to opposed mounting brackets on the rear of the ATV and are locked thereto. Each of panels 22, 24, 25, and 26, is assembled to top panel 50 and to each other with their contacting edges substantially sealed to each other with the aforementioned Velcro® or zipper connectors V.

The portable enclosure 10 of the invention can be further provided with a carrying case into which all components thereof may be packed for transport. For packing, panels 22, 24, 25, 26 and 50 are removed from the frame components and folded, and support beams 16 and 18 are separated from mounting brackets 40 and 46 and their segments folded to be parallel to each other. A similar separation and folding is done with cross braces 20. Segments a–e and the two segments each of cross braces 20 are sized to fit into the carrying case. The carrying case is preferably adapted to be mounted to a rack of ATV 12.

As described above, the portable enclosure provides a convenient cover for an ATV that may be used anywhere the ATV can go. Use of the portable enclosure of the invention protects the ATV from damage due to exposure to the weather and provides a hunting blind wherever the hunter takes the ATV.

It is noted that the embodiment of the all-terrain hut described herein in detail for exemplary purposes is of course subject to many different variations in structure, design, application and methodology. Because many varying and different embodiments may be made within the scope of the invention herein taught, and because many modifications may be made in the embodiment herein detailed in accordance with the descriptive requirements of the law, it is to be understood that the details herein are to be interpreted as illustrative and not in a limiting sense.

What is claimed is:

1. An all-weather portable enclosure adapted for use with a motorized open-top vehicle, comprising:
   (a) a pair of support beams, each having a first end and a second end;
   (b) four mounting brackets, each configured for receiving an end of one of the support beams wherein two of the brackets are capable of being fixedly connected to a front portion of the vehicle; and two of the brackets are capable of being fixedly connected to a rear portion of the vehicle;
   (c) the first and second ends of the support beams being removably connected to respective mounting brackets so as to form a pair of arches; and
   (d) a substantially weather resistant cover capable of removably attaching to the support beams wherein the beams and cover are adapted for substantially enclosing the vehicle when the mounting brackets are connected to a portion of the vehicle and the first and second ends of the support beams are connected to the mounting brackets.

2. A claim according to claim 1 wherein the motorized open-top vehicle is an all terrain vehicle.

3. A claim according to claim 1 wherein the motorized open-top vehicle is a riding law mower.

4. The portable enclosure according to claim 1 wherein the support beams each comprise a plurality of beam segments that are configured to engage one another for forming arches and disengage from one another for packing.

5. The portable enclosure according to claim 4 which further comprises a cord holding the beam segments engaged when the segments are reassembled to form a support beam.

6. The portable enclosure according to claim 5 wherein the cord is elastic.

7. The portable enclosure according to claim 6 wherein the beam segments are hollow and the cord positioned within the beam segments.

8. The portable enclosure according to claim 1 wherein the mounting brackets comprise a fastener for releasably locking the support beam ends thereto.

9. The portable enclosure according to claim 1 which further comprises one or more cross braces for being positioned tranversly between the pair of support beams.

10. The portable enclosure according to claim 1 wherein the cover comprises a plurality of panels.

11. The portable enclosure according to claim 10 wherein one of the panels is formed with one or more sleeves adapted for receiving the support beam.

12. The portable enclosure according to claim 1 wherein the cover is formed with at least one transparent portion.

13. The portable enclosure according to claim 12 wherein the transparent portion is adapted to be opened and closed.

14. The portable enclosure according to claim 10 wherein the panels are fitted with fasteners along mating edges thereon for assembling the panels to form a cover.

* * * * *